Patented May 14, 1940

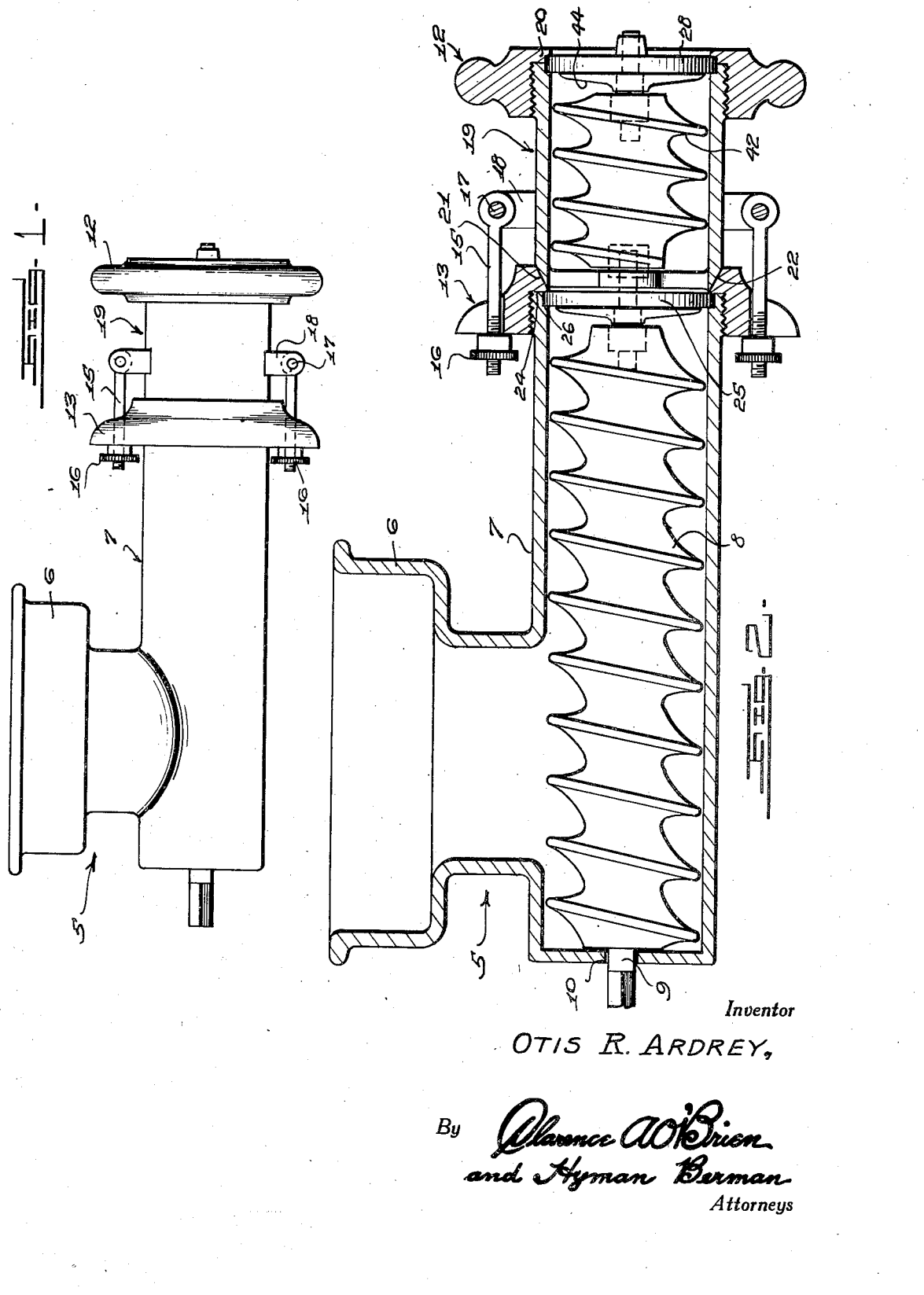

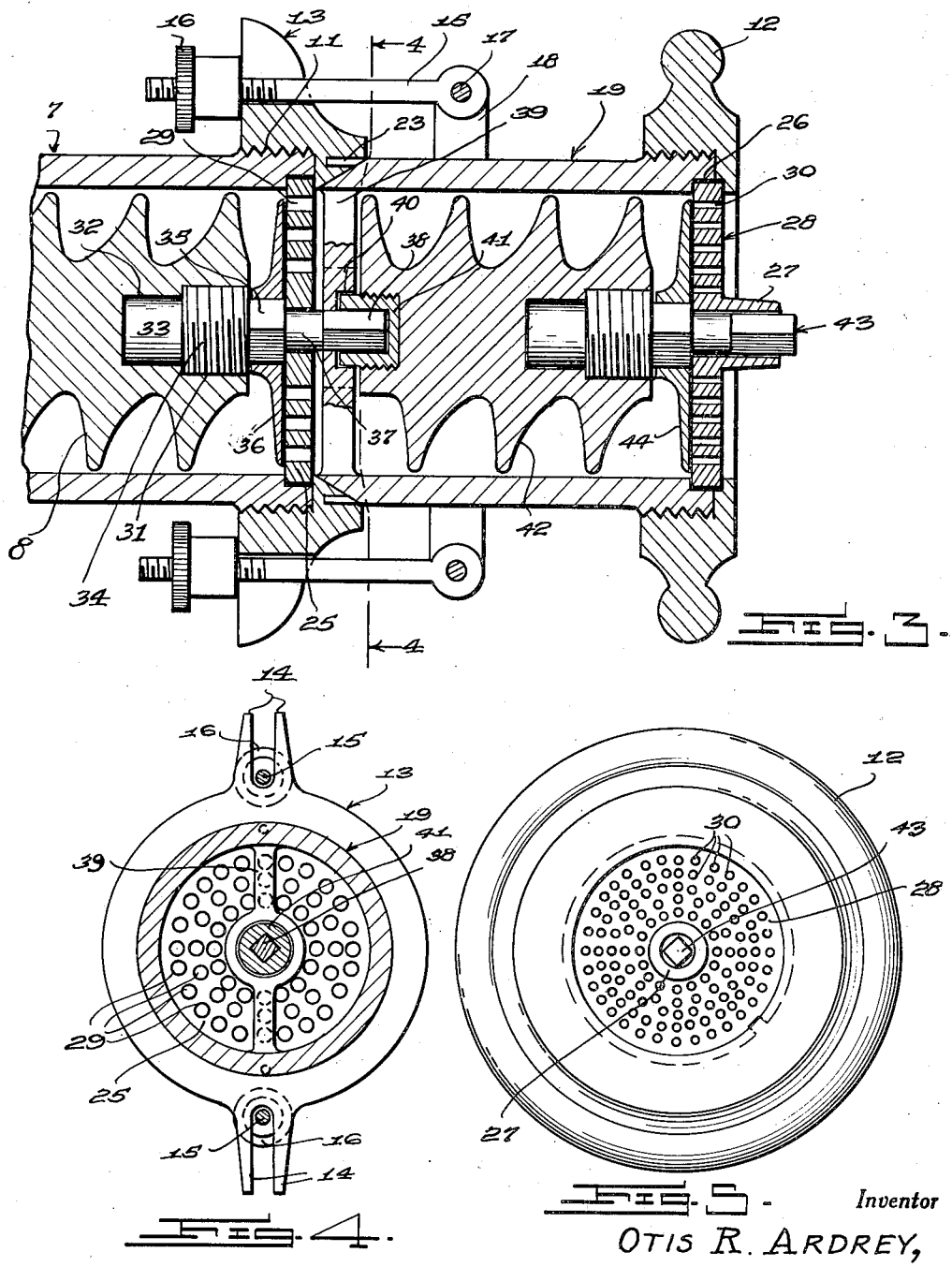

2,200,786

UNITED STATES PATENT OFFICE 2,200,786

MEAT GRINDER

Otis Roy Ardrey, Jefferson City, Mo.

Application November 15, 1938, Serial No. 240,562

5 Claims. (Cl. 146—187)

My invention relates generally to a meat grinder and the like, and particularly to an arrangement of this character in which the operation of initially grinding the meat or the like is succeeded by an operation of grinding the meat or the like to a finer size, without interruption between the operations, and an important object of my invention is to provide a simple and efficient arrangement of this character.

Another important object of my invention is to provide in a meat grinder or the like a removable attachment for the discharge end of the grinder so arranged as to receive the initially ground meat or the like from the discharge end of the grinder and immediately operate upon the same to produce a still finer consistency, thereby saving the trouble and expense ordinarily involved in producing the desired fineness of grind, and at the same time providing for a less spoiled condition of the meat or the like as the result of the reduction of the same to the desired grind.

Other important objects and advantages of my invention will be apparent from a reading of the following description taken in connection with the drawings, wherein for purposes of illustration I have shown a preferred embodiment of my invention.

In the drawings:

Figure 1 is a general side elevational view of the embodiment showing the attachment in place on a conventional meat grinder.

Figure 2 is an enlarged longitudinal vertical sectional view taken through Figure 1.

Figure 3 is a still further enlarged longitudinal vertical sectional view taken through the attachment and the adjacent portion of the conventional grinder.

Figure 4 is a transverse vertical sectional view taken through Figure 3 on a reduced scale and approximately on the line 4—4 and looking toward the left in the direction of the arrows.

Figure 5 is an end elevational view of Figure 3 taken from right to left.

Referring in detail to the drawings, the numeral 5 generally designates the primary unit, this being a conventional form of grinder for meat or the like which comprises the hopper 6 which rises from and is in communication with the left hand end portion of a horizontal generally cylindrical casing 7 in which is axially mounted the worm or feed screw device 8 which has a stub shaft 9 turning in a journal opening 10 in the left hand extremity of the casing 7 to which is attached an operating handle which is either manually or power driven. The conventional casing 7 has the external screw threads 11 on its right hand end which is arranged to receive the wheel cap which is generally designated 12, which wheel cap in the present invention is replaced by an adapter or attachment cap which is generally designated 13 and which is formed substantially similarly to the screw cap 12 except that the attachment cap 13 is provided at suitably circumferentially spaced intervals with pairs of lugs 14 which define keeper seats for reception of the swingable clamping bolts 15 which are provided with tightening nuts 16 to engage the longitudinally inward side of the lugs 14 as shown in Figures 2 and 3 of the drawings, the clamping bolts being mounted on pivots 17 supported between lugs 18 on the exterior of the attachment casing or secondary unit 19. A further variation in the form of the attachment cap 13 from the conventional wheel cap 12 is the elimination of the radially inwardly extending annular shoulder 20 and the replacement thereof with the beveled surface 21 which conformably receives a similar beveled surface 22 on the axially inward end of the attachment casing 19. Keys or pilot pins 23 engage the axially inward end of the attachment casing 19 and the adjacent part of the attachment cap 13 as illustrated in Figure 3 to prevent relative rotation of the attachment cap and the attachment casing 19.

As in the case of the wheel cap 12 the attachment cap 13 has a shoulder 24 which holds the grinding plate 25 in place against a groove 26 in the axially outward end of the grinder casing 7. In the instance of the grinding plate 25 the collar or extension 27 which exists on the conventional grinding plate 28 is removed so that both sides of the grinding plate 25 are smooth and flat, the conventional grinding plate 28 being used in the attachment casing 19 in a manner to be described, and being replaced in the grinder casing 7 by the grinder plate 25. Both plates are perforated as indicated by the respective numerals 29 and 30, the perforations 30 being smaller than the perforations 29 in order to achieve the desired reduction in size of the particles of meat or the like.

The right hand end of the screw feed 8 in the grinder casing 7 has an axial opening which has an enlarged threaded part 31 and a reduced unthreaded or smooth part 32 into which projects the smooth round portion 33 of the stub shaft which has the threaded part 34 received in the threaded bore 31 and also the squared part 35 on which the squared bore of the cruciform cutting knife 36 is non-revolubly mounted to bear against the cutter plate 25. The said stub shaft has a further reduced smooth part 37 which passes freely through an opening in the center of the plate 25 and beyond this has a squared portion 38 which passes freely through an opening in the diametrical brace or spider 39 which is fastened in the left hand end of the attachment casing 19 as clearly shown in Figure 3. The axially outward face of this element 39 has a bearing opening 40 in which turns the smooth end portion of the threaded coupling or bushing 41 which has a squared bore receiving the squared portion 38 of the said stub shaft, thereby connecting the stub shaft operatively to the attachment worm feed 42 which operates in the attachment casing 19. Another stub shaft, this one generally designated by the numeral 43 and similar in all respects to the first described stub shaft is similarly connected to the right hand or axially outward end of the attachment feed screw 42 and to an additional cutter knife 44 similar to the cutter knife 36 which operates in conjunction with the conventional cutter plate 28. As already intimated the cutter plate 28 is held in place on the right hand end of the attachment casing 19 by the wheel cap 12 which with the cutter plate was removed from the conventional meat grinder for this new location in accordance with the present invention.

Although I have shown and described herein a preferred embodiment of my invention, it is to be definitely understood that I do not desire to limit the application of the invention thereto, and any change or changes may be made in the structure and arrangement of the parts, within the spirit of the invention and the scope of the subjoined claims.

Having described the invention, what is claimed as new is:

1. In a twin style progressive product reduction grinder of the class described, a component auxiliary device comprising a secondary unit including an open-ended cylinder having an integral centrally apertured spider at one end, said one end being beveled, the inner face of the hub portion of said spider being formed with a socket constituting a bearing, an apertured disk at the opposite end of said cylinder, a removable clamping and retention ring on the last named end of said cylinder holding said disk in place, a feeding worm axially mounted for rotation in said cylinder and having a journal at one end cooperable with said disk, there being a bushing at the opposite end functioning as a journal and mounted for rotation in said bearing, said bushing having internal flat faces for accommodation of a companion driving member, bolts pivotally mounted on diametrically opposite external portions of the cylinder, and clamping nuts carried by said bolts in the manner and for the purposes described.

2. A dual first and second stage grinder for progressively reducing the ground product to desired consistency comprising a main unit including a cylinder, a feeding worm mounted for rotation in said cylinder, an apertured disk fitted in the discharge end of the cylinder, an adapter collar removably mounted on the discharge end and having a beveled retention flange holding said disk in place, said adapter collar being provided with diametrically opposed outstanding lugs forming keeper seats, a stub shaft carried by the discharge end of the feeding worm and extending through and beyond the disk, a cutter on said stub shaft in rotatable contact with the adjacent inner face of said disk, a secondary unit of an intact independent type comprising a cylinder beveled at its inner end to engage the beveled flange, a spider in said cylinder formed integral therewith and having its stub portion centrally apertured and provided with a socket forming a bearing, a worm having a coupling forming bushing constituting a journal and rotatable in said bearing, the projecting end of said stub shaft being located in said bushing and having a driving fit therewith, an apertured disk at the discharge end of the secondary cylinder, removable retaining means on the cylinder holding the disk in place, the adjacent end of the feeding worm in said secondary cylinder having rotatable supporting connection with said disk, a cutter on said supporting connection cooperable with the disk, bolts externally and pivotally mounted on the secondary cylinder and engageable in said keeper seats, and thumb nuts carried by the threaded ends of the bolts in the manner and for the purposes described.

3. As a new article of manufacture, a component part of a dual progressive grinder of the class described, a primary grinding unit comprising a casing including a cylinder externally screw-threaded at the discharge end thereof, an adapter collar threaded on said discharge end and provided with peripheral outstanding lugs forming keeper seats, said collar having on its inner periphery a beveled flange, one face thereof forming a disk accommodation and retention shoulder, the beveled side of said flange functioning to accommodate a companion beveled end of a complemental secondary grinder unit, a feeding worm mounted for rotation in said cylinder, a perforated disk removably mounted in the discharge end of the cylinder and abutting said shoulder forming flange, said disk being smooth and devoid of projections on opposite faces, a stub shaft attached to the feeding worm and projecting through and beyond an aperture in said disk, the projecting end being of polygonal cross-sectional form to provide a driving element, and a cutting member on the stub shaft interposed between the worm and disk and coacting with said disk.

4. A twin-style continuous first and second stage grinder of the class described comprising a primary unit having internal self-contained mechanism including a feeding worm, an apertured end disk, cutters cooperable with said disk, and adapter means maintaining the parts constantly assembled for independent grinding, said adapter means being designed to accommodate a secondary companion unit; and a secondary companion unit in longitudinal axial alignment with said primary unit, said secondary unit being wholly complete within itself and including a cylinder, a feeding worm, a bearing at one end of the cylinder accommodating said feeding worm, an apertured end disk at the opposite end of the cylinder supporting and accommodating the adjacent end of said feeding worm, and quick releasable means on said secondary unit engageable with said adapter means, whereby to permit the two units to be assembled for continuous progressive grinding, or to permit the secondary unit to be bodily detached from the primary unit, said secondary unit remaining intact with its parts completely organized while the primary unit is independently in use.

5. In a twin-style progressive product reduction grinder of the class described, a component auxiliary device comprising a secondary unit including an open-ended cylinder having a bearing at one end, said one end of the cylinder being beveled, an apertured disk at the opposite end of said cylinder, a removable clamping and retention ring on the last-named end of said cylinder holding said disk in place, a feeding worm axially mounted for rotation in said cylinder and having a journal at one end cooperable with said disk, there being a bushing at the opposite end functioning as a journal and mounted for rotation in said bearing, said bushing having internal flat faces for accommodation of a companion motion transmitting and driving member.

OTIS ROY ARDREY.